United States Patent
Balan et al.

(10) Patent No.: US 9,372,772 B1
(45) Date of Patent: Jun. 21, 2016

(54) CO-VERIFICATION—OF HARDWARE AND SOFTWARE, A UNIFIED APPROACH IN VERIFICATION

(71) Applicant: XPLIANT, Inc, San Jose, CA (US)

(72) Inventors: Mohan Balan, Santa Clara, CA (US); Harish Krishnamoorthy, San Jose, CA (US); Nimalan Siva, San Ramon, CA (US); Kishore Badari Atreya, San Jose, CA (US)

(73) Assignee: CAVIUM, INC., San Jose, CA (US)

( * ) Notice: Subject to any disclaimer, the term of this patent is extended or adjusted under 35 U.S.C. 154(b) by 0 days.

(21) Appl. No.: 14/671,993

(22) Filed: Mar. 27, 2015

(51) Int. Cl.
| | | |
|---|---|---|
| *G06F 11/27* | (2006.01) | |
| *G06F 9/45* | (2006.01) | |
| *G06F 17/50* | (2006.01) | |
| *G06F 9/44* | (2006.01) | |

(52) U.S. Cl.
CPC ............... *G06F 11/27* (2013.01); *G06F 8/427* (2013.01); *G06F 17/505* (2013.01); *G06F 8/71* (2013.01)

(58) Field of Classification Search
CPC .......... G06F 17/505; G06F 8/71; G06F 8/427
USPC ........................................................ 717/143
See application file for complete search history.

(56) References Cited

U.S. PATENT DOCUMENTS

| | | | |
|---|---|---|---|
| 6,154,464 A | 11/2000 | Feuerstraeter | |
| 6,182,258 B1* | 1/2001 | Hollander | G01R 31/31704 714/739 |
| 6,216,098 B1 | 4/2001 | Clancey | |
| 6,253,365 B1* | 6/2001 | Baldwin | G06F 17/505 703/13 |
| 6,667,985 B1 | 12/2003 | Drummond-Murray | |
| 7,236,918 B2* | 6/2007 | Roesner | G01R 31/318364 703/13 |
| 7,472,051 B2* | 12/2008 | Mariani | G06F 11/27 703/13 |
| 2003/0110339 A1 | 6/2003 | Calvignac | |
| 2005/0157653 A1 | 7/2005 | Zeitak | |
| 2007/0217759 A1 | 9/2007 | Dodd | |
| 2008/0098366 A1* | 4/2008 | Fong | G06F 17/505 717/135 |

FOREIGN PATENT DOCUMENTS

GB         2336076 A        6/1999

* cited by examiner

*Primary Examiner* — Ryan Coyer
(74) *Attorney, Agent, or Firm* — Haverstock & Owens LLP

(57) ABSTRACT

A co-verification method and system are described herein. The co-verification method is able to verify software and hardware at the same time. Constraints are provided to a software compiler which generates programming values. The programming values and stimulus from a verification test bench are utilized to test a design such as a microprocessor.

22 Claims, 3 Drawing Sheets

CO-VERIFICATION—OF HARDWARE AND SOFTWARE, A UNIFIED APPROACH IN VERIFICATION

FIELD OF INVENTION

The present invention relates to the field of networking.

BACKGROUND OF THE INVENTION

As microchips are growing in size, verifying 100% of the microchip is very difficult and takes a significant amount of time and effort. In a co-simulation model, a software team gives values to a hardware/verification team to program. The software team relies on the hardware team to provide models.

BRIEF SUMMARY

A co-verification method and system are described herein. The co-verification method is able to verify software and hardware at the same time. Constraints are provided to a software compiler which generates programming values. The programming values and stimulus from a verification test bench are utilized to test a design such as a microprocessor.

In one aspect, a method comprises receiving verification constraint information, compiling the verification constraint information to generate programming values and testing a design using the generated programming values and a stimulus from a test bench. The verification constraint information is written in a format readable by the compiler. The verification constraint information includes profile information including a particular device configuration enabling the device to perform specified functions. The verification constraint information includes only profile information. The design is a microchip design. Compiling the verification constraint information includes testing hardware and software at the same time. The programming values comprise programming language code. In some embodiments, the programming language code comprises C++.

In another aspect, a system comprises a hardware design under test and a software compiler, wherein the software compiler is configured to: receive verification constraint information, compile the verification constraint information to generate programming values, and test the hardware design using the generated programming values and a stimulus from a test bench. The verification constraint information is written in a format readable by the compiler. The verification constraint information includes profile information including a particular device configuration enabling the device to perform specified functions. The verification constraint information includes only profile information. The hardware design is a microchip design. Compiling the verification constraint information includes testing hardware and software at the same time. The programming values comprise programming language code.

In another aspect, a device comprises a memory for storing an application, the application configured to: receive verification constraint information and provide the verification information to a compiler, wherein the compiler compiles the verification constraint information to generate programming values and test a hardware design using the generated programming values and a stimulus from a test bench and a processing component coupled to the memory, the processing component configured for processing the application. The verification constraint information is written in a format readable by the compiler. The verification constraint information includes profile information including a particular device configuration enabling the device to perform specified functions. The verification constraint information includes only profile information. The hardware design is a microchip design. Compiling the verification constraint information includes testing hardware and software at the same time. The programming values comprise programming language code.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments.

DETAILED DESCRIPTION

Instead of the hardware team providing models to the software team, the reverse is implemented. The software team provides the hardware team the software team's programming directly. This is able to be referred to as co-verification, a new paradigm in verification. Constrained random is a known verification technique.

In the approach described herein, software initialization and a compiler are used to perform verification of useful customer features. This approach is more focused on use case testing than blind coverage of unused features. Additionally, hardware and software are verified at the same time and/or in parallel. Generally the chip stages are: design, verify, production, software, but here both are able to be performed before the final result of a design cycle (e.g., tapeout).

Figure 1:
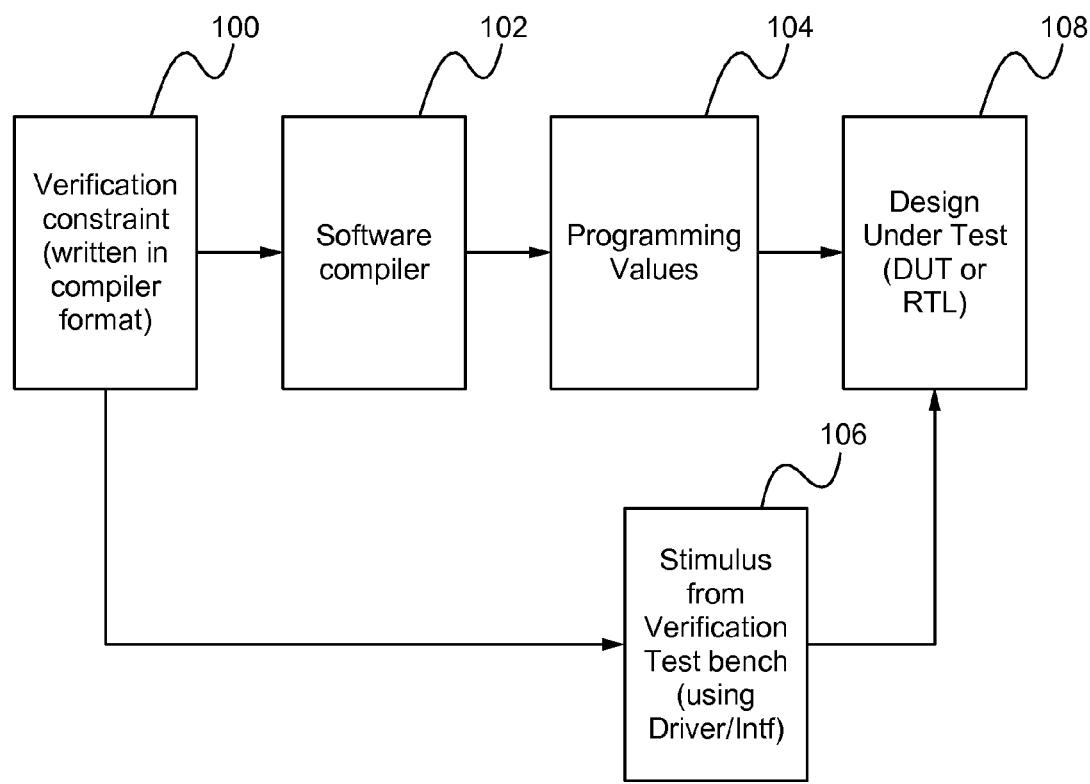
FIG. 1 illustrates a block diagram of steps of implementing the co-verification method according to some embodiments.

FIG. 1 illustrates a block diagram of steps of implementing the co-verification method according to some embodiments. In the step 100, verification constraints are generated. The verification constraints are written in a format readable or executable by the compiler. In some embodiments, the constraints are a profile (e.g., a particular device configuration enabling the device to carry out certain functions such as network functions or other non-network functions). In some embodiments, the constraints are generated automatically, and in some embodiments, the constraints are manually generated. In the step 102, a software compiler compiles code using the provided constraints. The software compiler performs as a typical compiler. The compiler outputs programming values 104. In some embodiments, the programming values 104 are C++ code or another programming language code. In the step 106, a stimulus from a verification test bench (using drivers/interfaces) is provided. The verification test bench is able to be any virtual environment used to verify the correctness of a design or model. The stimulus is able to be any type of stimulus such as test values, test scenarios or any other stimulus. In the step 108, the Design Under Test (DUT) or Register-Transfer Level (RTL) is tested. The test utilizes the programming values and/or the stimulus to test the design. The test is able to be any type of test such as a test emulator. In some embodiments, a full design (e.g., microchip) is tested, and in some embodiments, only part of the design is tested. In some embodiments, fewer or additional steps are implemented. In some embodiments, the order of the steps is modified.

As shown in FIG. 1, code is input to the compiler which generates programming for the hardware, includes constraints for verification, and is an end-to-end flow-based model with an intent check. Programming is performed using software compiler-based values, and stimulus to hardware and monitors/checkers/scoreboards is done through a hardware verification test bench. For example, a bridging and routing profile is able to be verified easily using the customer initialization code in a verification environment.

Figure 2:
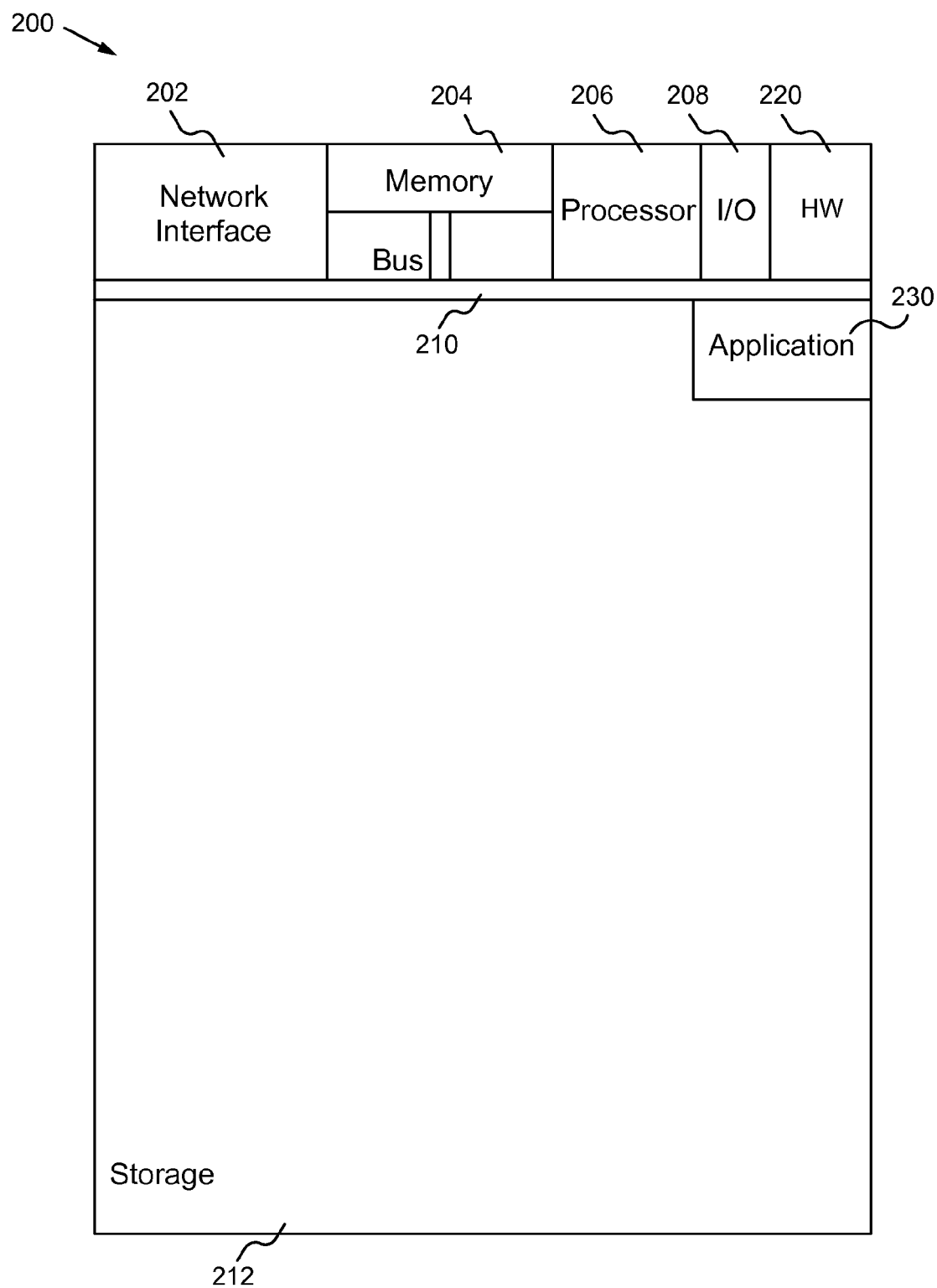
FIG. 2 illustrates a block diagram of an exemplary computing device configured to implement the co-verification method according to some embodiments.

FIG. 2 illustrates a block diagram of an exemplary computing device configured to implement the co-verification method according to some embodiments. A computing device 200 is able to be used to acquire, store, compute, process, communicate, receive, send, and/or display information such as data packets. In general, a hardware structure suitable for implementing the computing device 200 includes a network interface 202, a memory 204, a processor 206, I/O device(s) 208, a bus 210 and a storage device 212. The choice of processor(s) is not critical as long as suitable processor(s) with sufficient speed are chosen. The memory 204 is able to be any conventional computer memory known in the art. The storage device 212 is able to include memory, a hard drive, CDROM, CDRW, DVD, DVDRW, High Definition disc/drive, ultra-HD drive, flash memory card or any other storage device. The computing device 200 is able to include one or more network interfaces 202. An example of a network interface includes a network interface controller or a network card connected to an Ethernet or other type of Local Area Network (LAN). The I/O device(s) 208 are able to include one or more of the following: keyboard, mouse, monitor, screen, printer, modem, touchscreen, button interface and other devices. Co-verification application(s) 230 used to perform the co-verification method may be stored in the storage device 212 and memory 204 and processed as applications are typically processed. More or fewer components shown in FIG. 2 are able to be included in the computing device 200. In some embodiments, co-verification hardware 220 is included. Although the computing device 200 in FIG. 2 includes applications 230 and hardware 220 for the co-verification method, the co-verification method is able to be implemented on a computing device in hardware, firmware, software or any combination thereof. For example, in some embodiments, the co-verification applications 230 are programmed in a memory and executed using a processor. In another example, in some embodiments, the co-verification hardware 220 is programmed hardware logic including gates specifically designed to implement the co-verification method.

In some embodiments, co-verification application(s) 230 include several applications and/or modules. In some embodiments, modules include one or more sub-modules as well. In some embodiments, fewer or additional modules are able to be included.

Examples of suitable computing devices include a server, a personal computer, a laptop, a mobile device (e.g., smart phone), a network switch, a router, a hub, any other networking equipment and any other computing devices.

Figure 3:
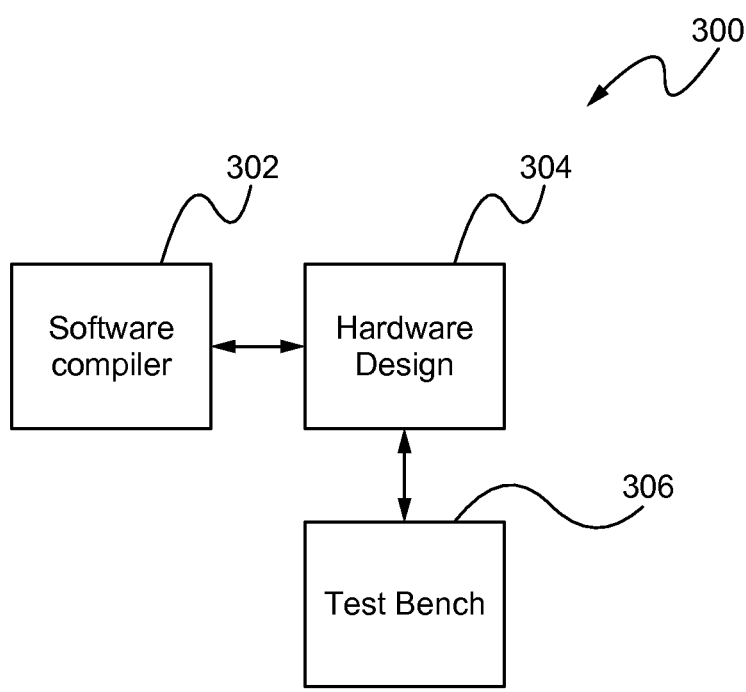
FIG. 3 illustrates a block diagram of a system for co-verification according to some embodiments.

FIG. 3 illustrates a block diagram of a system for co-verification according to some embodiments. The system 300 includes a software compiler 302, a hardware design 304 and a test bench 306. In some embodiments, the software compiler 302, the hardware design 304, and the test bench 306 are part of the same device or different, separate devices. The hardware design 304 is able to include a physical hardware implementation (e.g., a physical microchip) or a software representation. As described herein, the software compiler 302 receives one or more constraints, and compiles code to generate programming values. The hardware design 304 is tested using any test implementation. The test utilizes the programming values generated by the software compiler 302 and stimulus provided by the test bench 306. The test results in any form of outputs such as pass/fail component results or any other information usable by software and hardware teams to debug and analyze the hardware design 304. In some embodiments, fewer or additional components are implemented.

To utilize the co-verification method and apparatus, software and hardware are developed. Both are able to be tested using the co-verification method and apparatus by inputting a verification constraint based on the software to a software compiler which generates programming values which are used in conjunction with stimulus from a verification test bench to test a hardware design.

In operation, the co-verification method and apparatus use a software compiler to verify hardware (e.g., a significant amount of code re-use is performed across software and hardware teams). The co-verification method apparatus perform verification focusing on use-case features instead of code coverage of unused customer features. The co-verification method and apparatus verify software and hardware in parallel, thereby saving time and confidence of feature functionality. The co-verification method and apparatus greatly reduce or remove the requirement of software QA during profile testing as well as once the chip is in lab during bring up.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

We claim:

1. A method of co-verification of a compiler and a device under test within a test bench verification environment implemented by a test bench, the method comprising:
   providing verification constraint information including code to implement one or more desired design features for the device under test;
   compiling the verification constraint information with the compiler to generate programming values for the device under test;
   generating the device under test within the test bench verification environment based on the programming values produced by the compiler such that the device under test operates according to the programming values; and
   performing verification tests on the device under test to test one or more of the desired design features using stimulus from the test bench thereby testing both the compiler and the device under test.

2. The method of claim 1 wherein the verification constraint information is written in a format readable by the compiler.

3. The method of claim 1 wherein the verification constraint information includes profile information including a particular device configuration enabling the device to perform specified functions.

4. The method of claim 1 wherein the verification constraint information includes only profile information.

5. The method of claim 1 wherein the one or more desired design features comprise a microchip design.

6. The method of claim 1 wherein compiling the verification constraint information includes testing hardware and software at the same time.

7. The method of claim 1 wherein the programming values comprise programming language code.

8. The method of claim 7 wherein the programming language code comprises C++.

9. A system for co-verification of a compiler and a device under test within a test bench verification environment implemented by a test bench, the system comprising:
   a hardware device under test;
   a software compiler, wherein the software compiler is configured to receive verification constraint information including code to implement one or more desired design features for the device under test, and compile the verification constraint information to generate programming values for the device under test; and
   a test bench operating a test bench verification environment configured to instantiate the device under test within the test bench verification environment based on the programming values produced by the compiler such that the device under test operates according to the programming values and performing verification tests on the device under test to test one or more of the desired design features using a stimulus from the test bench thereby testing both the compiler and the device under test.

10. The system of claim 9 wherein the verification constraint information is written in a format readable by the compiler.

11. The system of claim 9 wherein the verification constraint information includes profile information including a particular device configuration enabling the device to perform specified functions.

12. The system of claim 9 wherein the verification constraint information includes only profile information.

13. The system of claim 9 wherein the one or more desired design features comprise a microchip design.

14. The system of claim 9 wherein compiling the verification constraint information includes testing hardware and software at the same time.

15. The system of claim 9 wherein the programming values comprise programming language code.

16. A test bench for implementing a test bench verification environment including a compiler and testing a device under test, the test bench comprising:
   a memory for storing the test bench verification environment and the compiler, wherein the compiler is configured to receive verification constraint information including code to implement one or more desired design features for the device under test and compile the verification constraint information to generate programming values for the device under test, and further wherein the test bench verification environment is configured to instantiate the device under test within the test bench verification environment based on the programming values produced by the compiler such that the device under test operates according to the programming values and performing verification tests on the device under test to test one or more of the desired design features using a stimulus from the test bench thereby testing both the compiler and the device under test; and
   a processing component coupled to the memory, the processing component configured for processing the test bench verification environment and the compiler.

17. The device of claim 16 wherein the verification constraint information is written in a format readable by the compiler.

18. The device of claim 16 wherein the verification constraint information includes profile information including a particular device configuration enabling the device to perform specified functions.

19. The device of claim 16 wherein the verification constraint information includes only profile information.

20. The device of claim 16 wherein the one or more desired design features comprise a microchip design.

21. The device of claim 16 wherein compiling the verification constraint information includes testing hardware and software at the same time.

22. The device of claim 16 wherein the programming values comprise programming language code.

* * * * *